United States Patent [19]

Hirzel

[11] Patent Number: 5,669,573
[45] Date of Patent: Sep. 23, 1997

[54] BELT RETRACTOR

[75] Inventor: Uwe Hirzel, Auenwald, Germany

[73] Assignee: TRW Occupant Restraint Systems GmbH, Alfdorf, Germany

[21] Appl. No.: 605,170

[22] PCT Filed: Jul. 7, 1995

[86] PCT No.: PCT/EP95/02657

§ 371 Date: Mar. 6, 1996

§ 102(e) Date: Mar. 6, 1996

[87] PCT Pub. No.: WO96/01751

PCT Pub. Date: Jan. 25, 1996

[30] Foreign Application Priority Data

Jul. 7, 1994 [DE] Germany .......... 44 23 958.0

[51] Int. Cl.$^6$ .......... B60R 22/405; B60R 22/41
[52] U.S. Cl. .......... 242/383.1; 242/384.1
[58] Field of Search .......... 242/383.1, 384.1; 280/806, 807

[56] References Cited

U.S. PATENT DOCUMENTS

| | | | |
|---|---|---|---|
| 4,570,873 | 2/1986 | Kurtti | 280/806 |
| 4,729,523 | 3/1988 | Saitou et al. | 242/384.1 |
| 5,169,085 | 12/1992 | Kalbantner et al. | 242/383.1 |

FOREIGN PATENT DOCUMENTS

| | | | |
|---|---|---|---|
| 0 359 960 A2 | 3/1990 | European Pat. Off. | 242/384.1 |
| 81762/88 | 5/1988 | Japan . | |

Primary Examiner—John P. Darling
Attorney, Agent, or Firm—Tarolli, Sundheim, Covell, Tummino & Szabo

[57] ABSTRACT

A belt retractor for an occupant restraining system in vehicles is provided with a belt drum (12) rotatably mounted in a frame (10) and acted upon by a wind-up spring, a locking mechanism for the belt drum and able to be activated by the pivoting, caused in a manner responsive to the vehicle and/or the belt webbing, of at least one actuator pawl (20a; 24), and catch elements (32, 34; 50, 62) pivotally mounted on the belt drum (12) and able to rotate in relation it, said catch elements (32, 34; 50, 62) and the actuator pawl (20a; 24) being able to assume, by rotation of the belt drum (12) in the windup direction, a first position in relation to each other in which the catch elements (32, 34; 50, 62) engage the actuator pawl (20a; 24) and prevent pivoting thereof, and by rotation in the unwinding direction a second position, in which the catch elements (32, 34; 50, 62) clear the actuator pawl (20a; 24). For the transition from the first position to the second one rotation of the belt drum (12) through a predetermined angular movement of at least approximately 10° is necessary. This prevents any undesired locking of the belt drum on taking up the belt webbing in a reliable, safe fashion.

11 Claims, 8 Drawing Sheets

BELT RETRACTOR

The invention relates to a belt retractor for an occupant restraining system in vehicles comprising a belt drum rotatably mounted in a frame and acted upon by a wind-up spring, a locking mechanism for the belt drum and adapted to be activated by the pivoting, caused in a manner responsive to the vehicle and/or the belt webbing, of at least one actuator pawl, and catch elements pivotally mounted on the belt drum and able to rotate in relation to the drum, said catch elements and the actuator pawl being able to assume, by rotation of the belt drum in the wind-up direction, a first position in relation to each other in which the catch elements engage the actuator pawl and prevent pivoting thereof, and by rotation in the unwinding direction a second position, in which the catch elements clear the actuator pawl.

In such a belt retractor an unintended locking of the belt drum may occur, if the retraction operation is abruptly terminated, for example because the male lug of the safety belt strikes an obstruction or catches in the belt diverter fitting, or if the termination of the retraction operation coincides with vibration of the belt retractor, as for example on folding back a rear seat bench, should the belt retractor be mounted adjacent to the rear luggage space of a vehicle. In such cases owing to sharp deceleration of the belt drum locking of the drum will be caused in a manner sensitive to the belt webbing, or owing to vibration in the drum, in a manner sensitive to the vehicle with the result that later draw off of belt webbing is prevented.

Various different measures have already been proposed to avoid such undesired locking. Such measures do however involve relatively high costs of manufacture and assembly; nevertheless in the case of a particularly sudden termination of the wind-up movement of the belt drum or in the case of heavy vibration of the belt retractor it is impossible to prevent locking thereof reliably.

The present invention is to provide a belt retractor, in the case of which such undesired locking is prevented using simple means, a small number of additional components and without adjustment after assembly. In the belt retractor of the invention a rotation of the belt drum through a predetermined angular range of at least approximately 10° is necessary for the transition from the first into the second position. This ensures that even in the case of an abrupt termination of the wind-up movement of the belt webbing or in the case of powerful vibration or shaking of the belt retractor unintended locking of the belt drum is reliably prevented. The avoidance of locking of the belt drum for the predetermined angular movement is without any effect on the proper functioning of the belt retractor, since in the case of an optimum setting of the belt retractor as well the belt drum must perform a certain degree of rotation for initiation of locking thereof in a manner responsive to the belt webbing or to the vehicle.

Preferably there is a provision such that the predetermined angular movement lies between approximately 20° and approximately 25°.

In the case of one possible embodiment of the invention there is the provision that the actuator pawl is pivotally mounted on one side of the belt drum and may be brought into engagement with internal tooth means of an activating ring, which is rotatably mounted on the frame, by means of a control cam, which is formed on a control disk, which is mounted on the belt drum for limited rotation, that the actuator pawl possesses a head and that the catch elements comprise a brake disk rotatably mounted on the belt drum, which brake disk is retarded by friction between it and the frame and possesses a catch part, which in a first position engages the head and in the second position releases same. The components called for in addition to those necessary for a conventional belt retractor, namely the brake disk and the friction element, may be readily integrated in already existing systems and hardly cause any additional costs. Since the frictional force required for braking the brake disk is very low, rotation of the belt drum is hardly obstructed so that the effect on the force necessary for unwinding and retraction is negligible.

In accordance with a preferred development of the preceding embodiment of the invention it is possible to provide a design such that the catch elements furthermore comprise a pivotally mounted catch lever which is fictionally coupled with the belt drum and is mounted for limited pivoting around the axis thereof, such lever being provided with a circularly arcuate abutment surface, which extends over a range equal to the angular movement and which in the first position engages an actuator pawl of an inertial sensor and in the second position releases same. On taking up belt webbing such a belt retractor ensures that neither the actuator pawl of the locking mechanism nor the combined inertial sensor and actuator pawl may pivot into engagement with the tooth means associated with them. If there is an action only applied to the actuator pawl of the locking mechanism and the pivoting thereof is prevented, there may, if the belt retractor is heavily shaken, nevertheless be an engagement of a combined inertial sensor and actuator pawl with the external tooth means of the control wheel with the result that unwinding of belt webbing from the belt drum is obstructed. For reliable avoidance of undesired locking of the belt drum pivoting both of the actuator pawl of the locking mechanism and also of the combined inertial sensor and actuator pawl must be forestalled.

Further features and developments of the invention will be understood from the following detailed description in conjunction with the drawings.

In FIGS. 1 through 4 the reader will be able to see one belt retractor in accordance with a first embodiment of the invention. In such retractor a belt drum 12 is rotatably mounted in a load bearing frame 10. Within a protective cap 14 mounted on one side of the frame 10 a control mechanism sensitive to the vehicle and to the belt is accommodated for the catch system (not illustrated) of the belt retractor. On the opposite side of the belt retractor a wind-up spring (not illustrated) is arranged in a conventional fashion.

Figure 1:
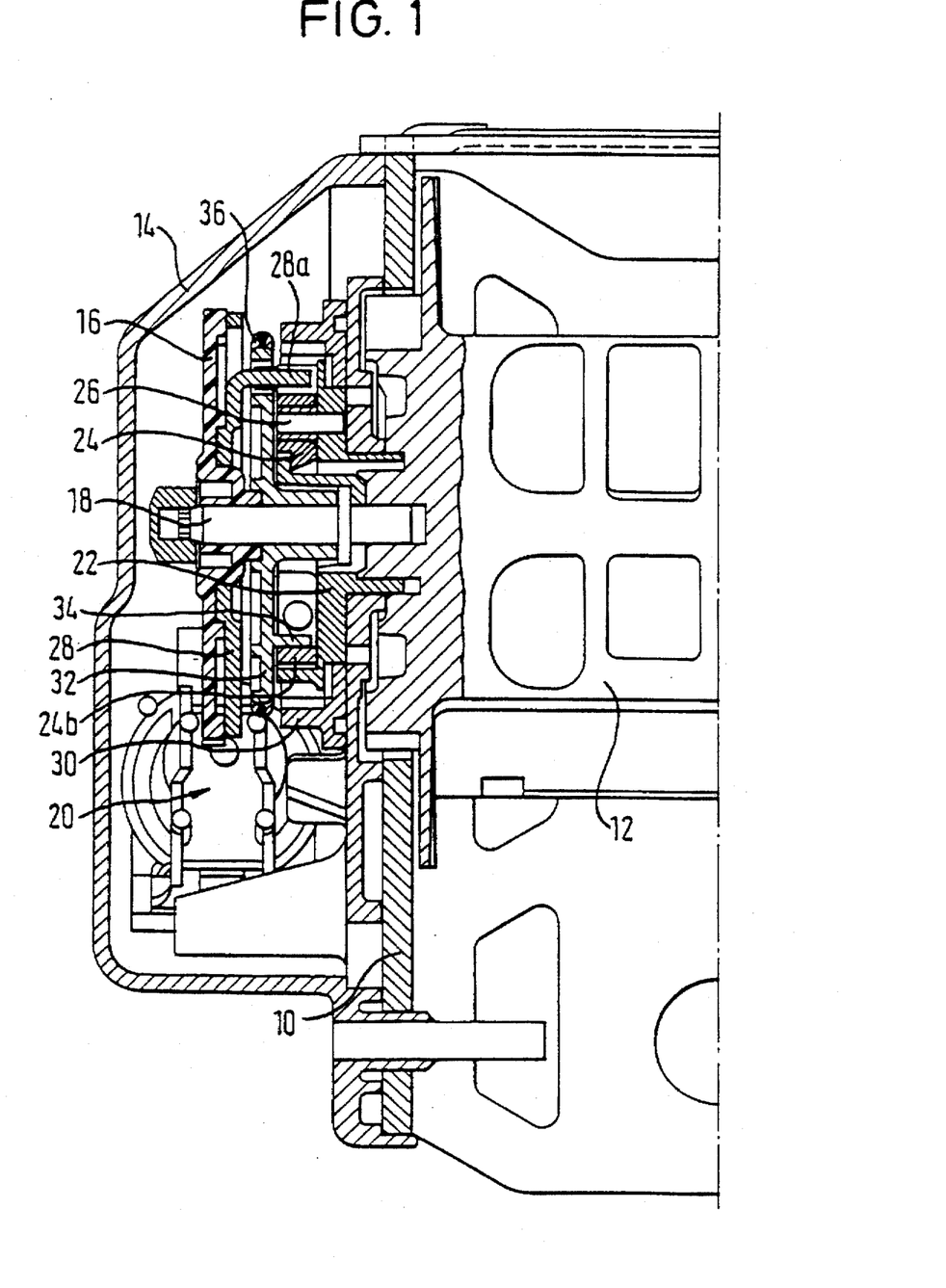
FIG. 1 shows an axial section of part of a belt retractor in accordance with a first embodiment.
Figure 2:
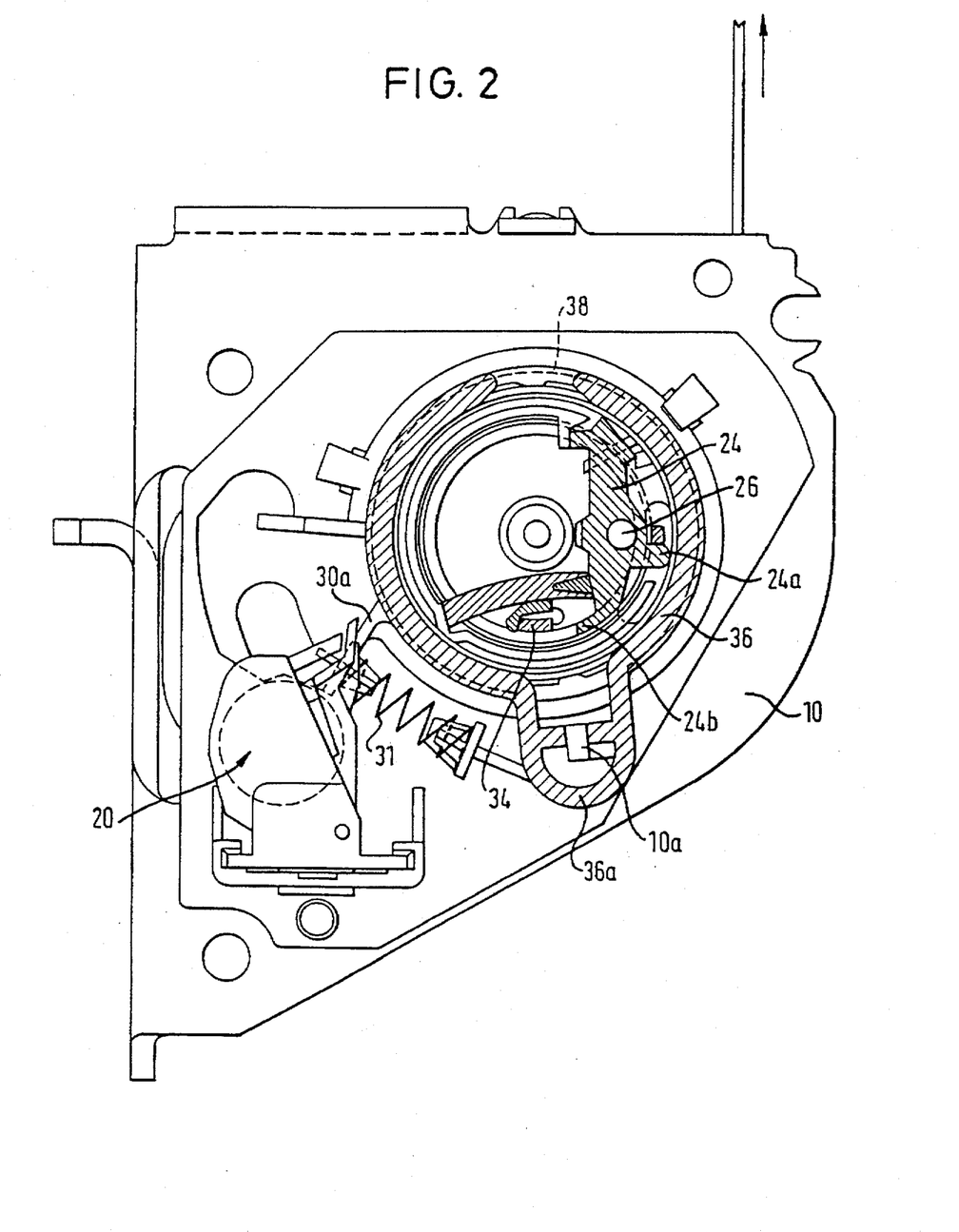
FIG. 2 shows a diagrammatic lateral elevation of the belt retractor of FIG. 1 in the process of unwinding the belt.
Figure 3:
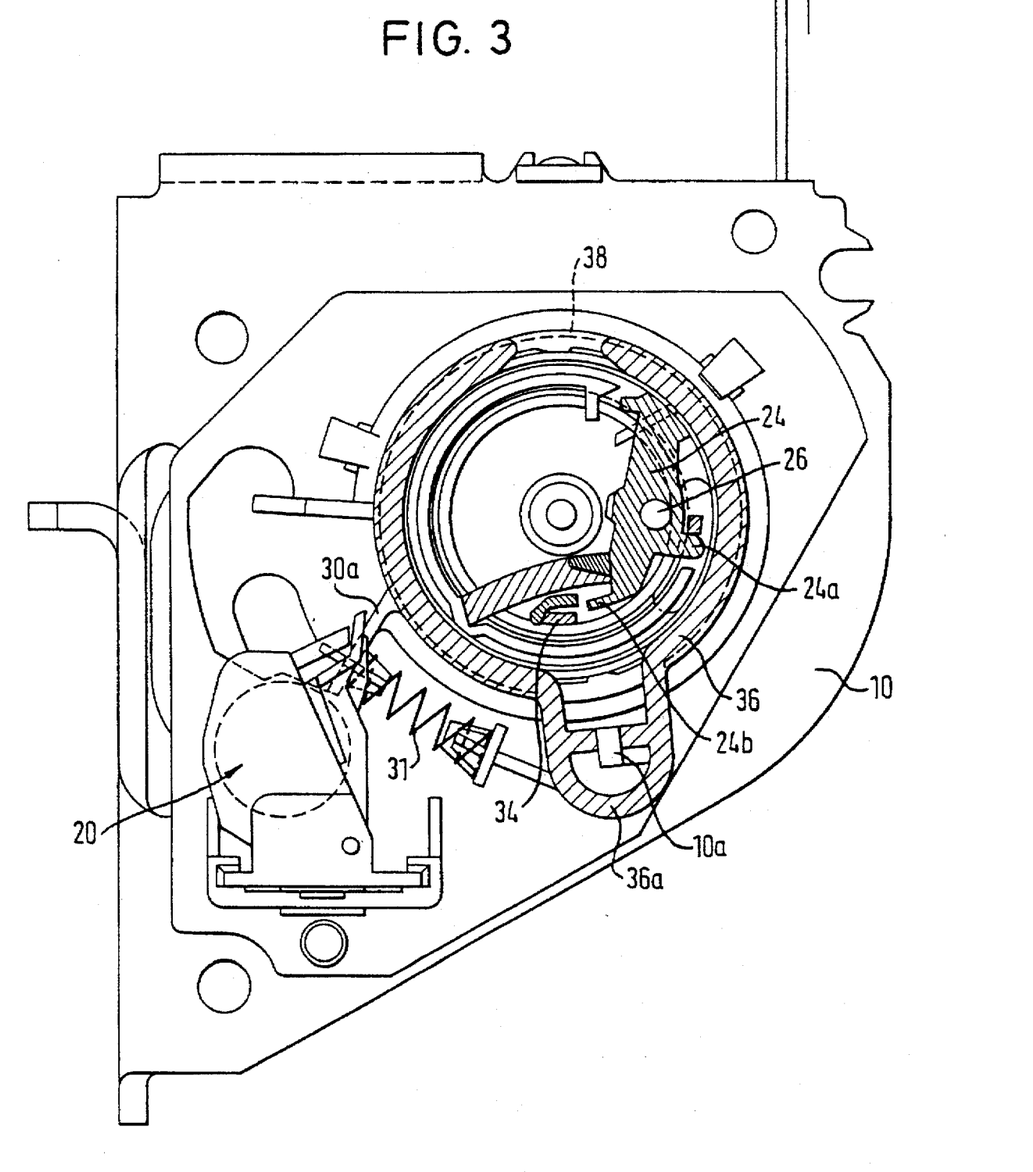
FIG. 3 shows a corresponding lateral elevation with the actuator pawl engaged.

The control mechanism comprises an externally toothed control disk 16, which is mounted in a rotatable manner on the belt drum 12 by means of a bearing pin 18. An inertial sensor 20 cooperates with the external tooth means of the control disk 16, such sensor being conventionally constituted by an inertial ball and a pivotally mounted combined inertial sensor and actuator pawl 20a to be moved into engagement with the external tooth means on the control disk 16 by the inertial ball. On a bearing plate 22, which is connected with the belt drum 12 in such a manner as to prevent relative rotation an actuator pawl 24 is pivotally mounted by means of a bearing pin 26. In order to increase the inertia of the disk 16, which is made of plastic, an inertial disk 28 of a metallic material is coupled in such a manner as to prevent relative rotation. This inertial disk 28 is provided with a control cam 28a, cooperating with an actuator pawl 24 and, when there is a relative rotation between the belt drum and the control disk 16, thrusts against a radial spur 24a on the actuator pawl 24 with the result that the tip of same is pivoted outward as shown in FIG. 3. In this condition it will engage internal tooth means in an activating ring 30, which surrounds the bearing plate 22 and is rotatably mounted in the frame 10. The activating ring 30 is provided with a radial arm 30a, which is supported by a compression spring 31 on the frame 10. By rotation of the activating ring 30 the catch pawl of the catch system (not illustrated) is brought into its operating position in a conventional manner.

By means of the bearing pin 18 a brake disk 32 is furthermore rotatably mounted on the side of the belt drum 12. The brake disk 32 is provided with a catch element 34 extending perpendicularly toward the bearing plate 22, such catch element 34 being formed by a narrow wall part extending in an arcuate fashion on the external periphery of the brake disk 32 for an angle of a few degrees. A friction ring 36 is fitted about the external periphery of the brake disk 32 and has a groove formed in its outer periphery. A spring ring 38 is received in this groove and thrusts the friction ring 36 with moderate force against the outer periphery of the brake disk 32. The friction ring 36 is provided with a U-shaped holding part 36a held on a laterally projecting lug 10a on the frame 10 so that the friction ring 36 is held in such a manner as to prevent relative rotation and owing to frictional engagement with the brake disk 32 brakes rotation thereof. This braking action is however designed to be so small that the wind-up and unwinding forces on the belt drum 12 are not substantially affected.

Figure 4:
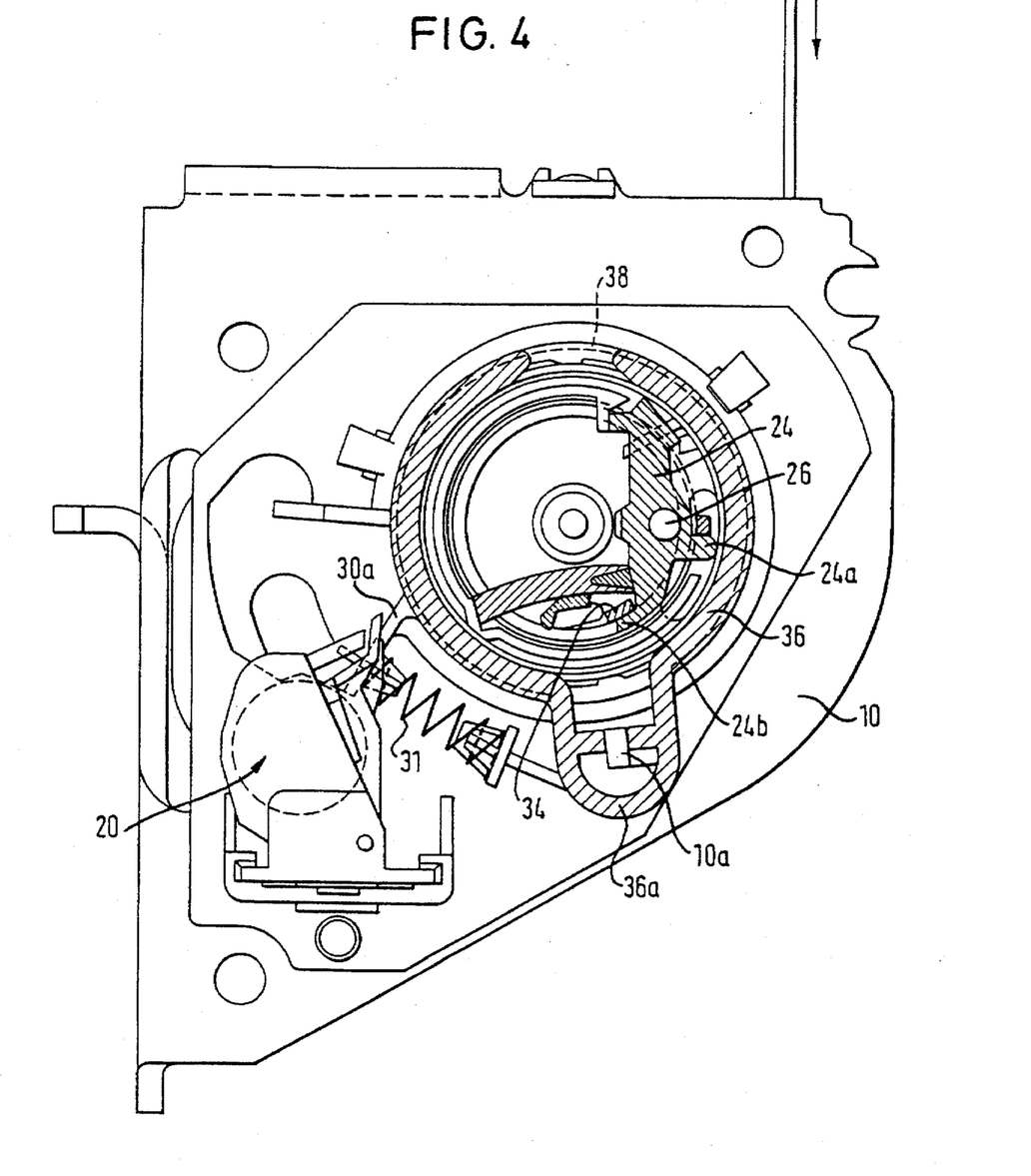
FIG. 4 depicts a corresponding lateral elevation during rotation of the belt drum of FIG. 1 in the wind-up direction.

At its end remote from the tip the actuator pawl 24 possesses an elongated head 24b which is gently curved in an arcuate manner. When the belt drum is turned in the wind-up direction, as shown in FIG. 4, the head 24b will firstly move toward the catch part 34 and will then move radially outside of and past it until the said catch part 34 abuts the actuator pawl 24. After this the brake disk 32, which, owing to the friction produced by the friction ring 36, has so far remained stationary, will be entrained in rotation and will rotate with the belt drum until there is a reversal in the direction of rotation. When such reversal in the direction of rotation takes place, the catch part 34 will come clear of the actuator pawl 24 and the brake disk 32 will be halted again by friction. However as long as the catch part 34 is hooked about the head 24b, i.e. for the predetermined angular movement corresponding to the extent of the head 24b in the peripheral direction, the actuator pawl 24 will be prevented from pivoting into engagement with the internal tooth means on the activating ring 30, since the head 24b abuts the catch part 34. It is only when after such rotation in the unwinding direction through the predetermined angular movement the catch part 34 releases the head 24b that the actuator pawl 24 may be pivoted in a manner sensitive to the vehicle or the belt webbing by the control cam 28a and come into engagement with the internal tooth means of the activating ring 30, as shown in FIG. 3. The predetermined angular movement, which must be performed by the belt drum for the actuator pawl 24 to be released after being held captive, amounts to at least approximately 10° and preferably between approximately 20° and approximately 25°.

In accordance with a preferred further development, illustrated in FIGS. 5 through 8, of the preceding embodiment there is, in addition to the catch action on the actuator pawl 24 of the locking mechanism on taking up the belt webbing, a catch action effective for the actuator pawl 20a of the inertial sensor 20 responsive to the vehicle. Only the additional components and their function will be described; the remaining parts are the same as in the preceding embodiment.

Figure 5:
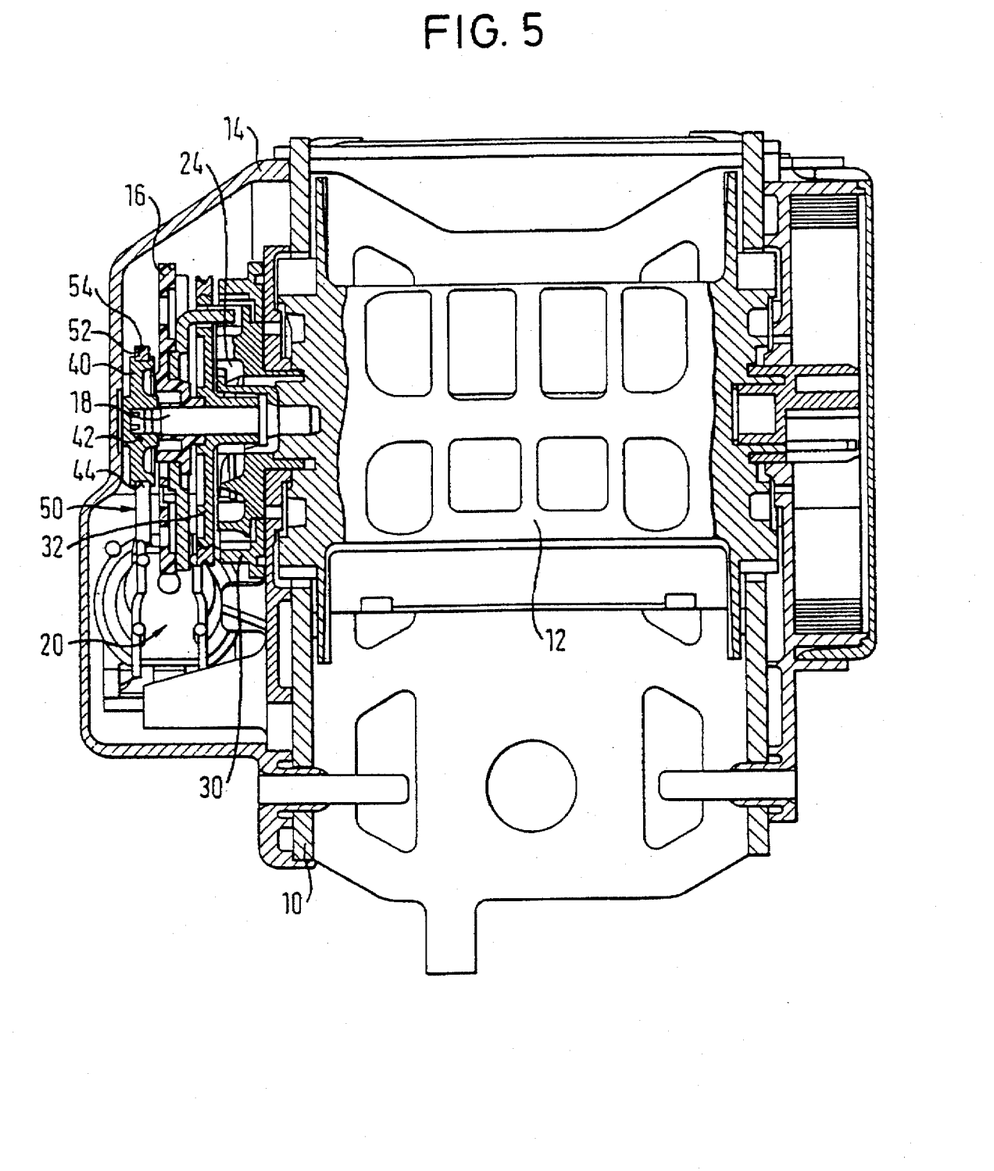
FIG. 5 is an axial section of part of a belt retractor in accordance with a further embodiment.

A hub-like bearing part 40 is connected in such a manner as to prevent relative rotation on the bearing pin 18 of the belt drum by the end of the bearing pin 18 being press fitted in the concentric hole 42 in the bearing part 40. The bearing part 40 is provided on its outer periphery with an encircling groove 44, in which two circularly arcuate arms 46 and 48 of a catch lever are held which is generally referenced 50. In their outer periphery these circularly arcuate arms 46 and 48 for their part have a groove 52 into which an annular spring 54 fits which surrounds the said circularly arcuate arms 46 and 48. The catch lever 50 is provided with two radial arms 56 and 58 which are spaced apart in the circumferential direction. At their end opposite to the bearing pin 18 the radial arms 56 and 58 are connected together by a rib 60 extending in the peripheral direction and having an engagement surface 62 on the radially outer side, such rib being extended at the end opposite to the arm 56 by a projection 64, which can come into engagement with the lug 10a. The engagement surface 62 is arranged at such a distance from the bearing pin 18 that it may come into engagement with the combined inertial sensor and actuator pawl 20a. At one end of the engagement surface 62 a head 66 is formed.

Figure 6:
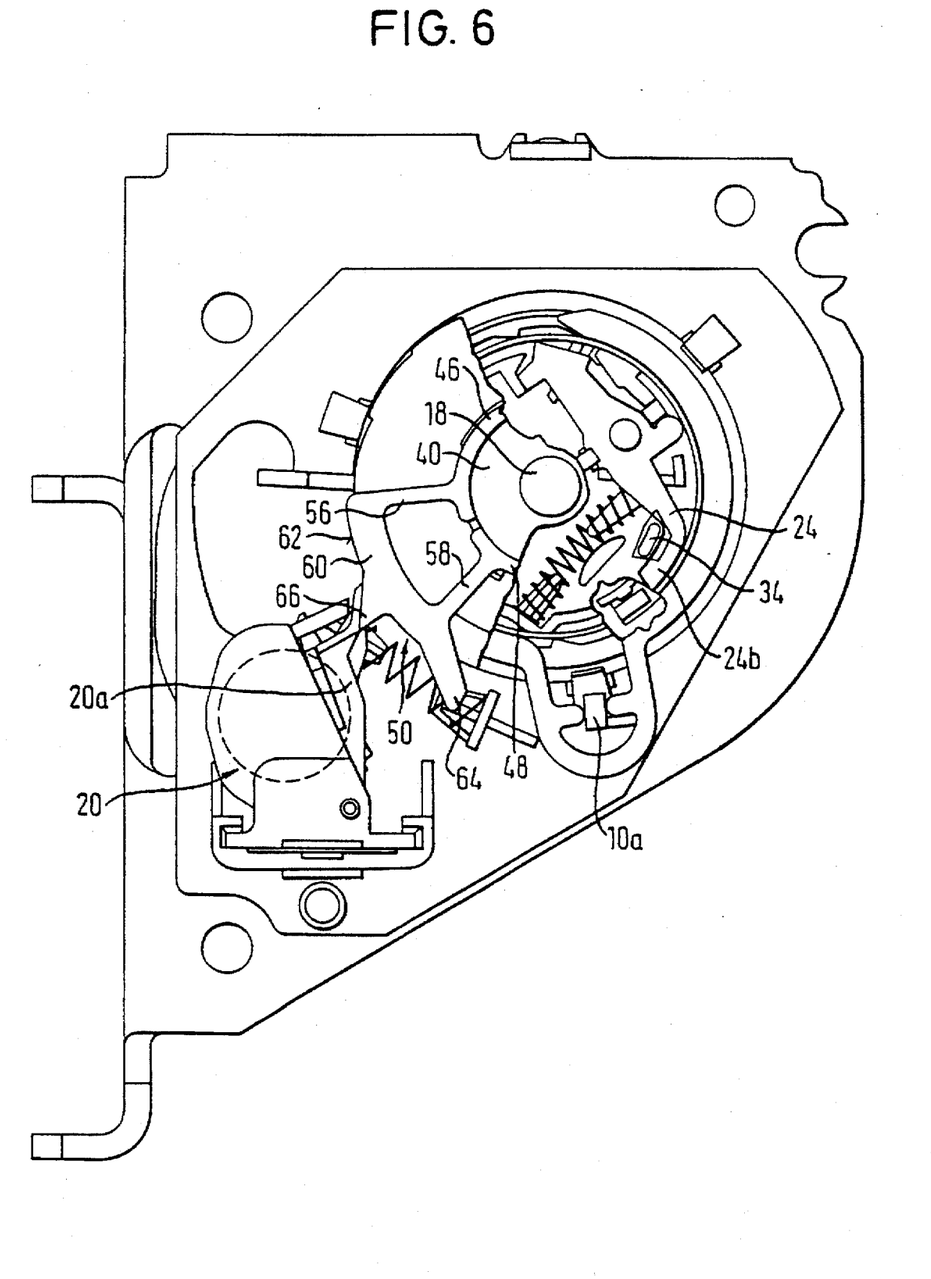
FIG. 6 is a diagrammatic lateral elevation of the belt retractor of FIG. 5 with the actuator pawls locked.

In FIG. 6 the catch lever 50 is depicted in the first position on winding up of the belt webbing. Owing to the frictional engagement of the circularly arcuate arms 46 and 48 on the bearing part 40 on rotation of the belt drum 12 the catch lever 50 is turned clockwise in terms of FIG. 6 until the head 66 of the rib 60 rides onto the tip of the combined inertial sensor and actuator pawl 20a. In this position pivoting of the combined inertial sensor and actuator pawl 20a into engagement with the external tooth means of the control disk 16 is prevented. Simultaneously pivoting of the control lever 24 is prevented, since the catch part 34 engages the head 24b.

Figure 7:
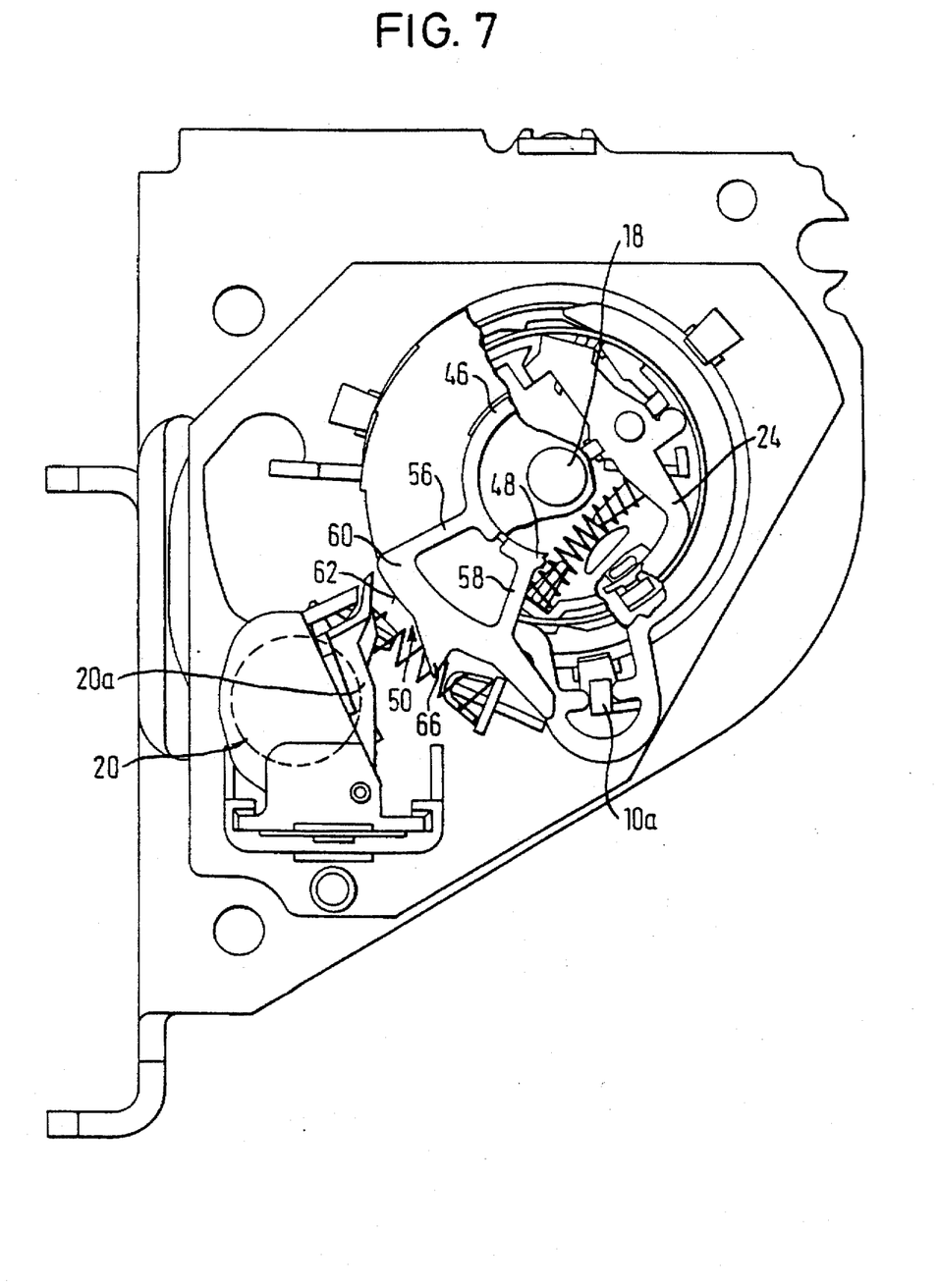
FIG. 7 shows a diagrammatic lateral elevation of the belt retractor of FIG. 5 in a transitional state.
Figure 8:
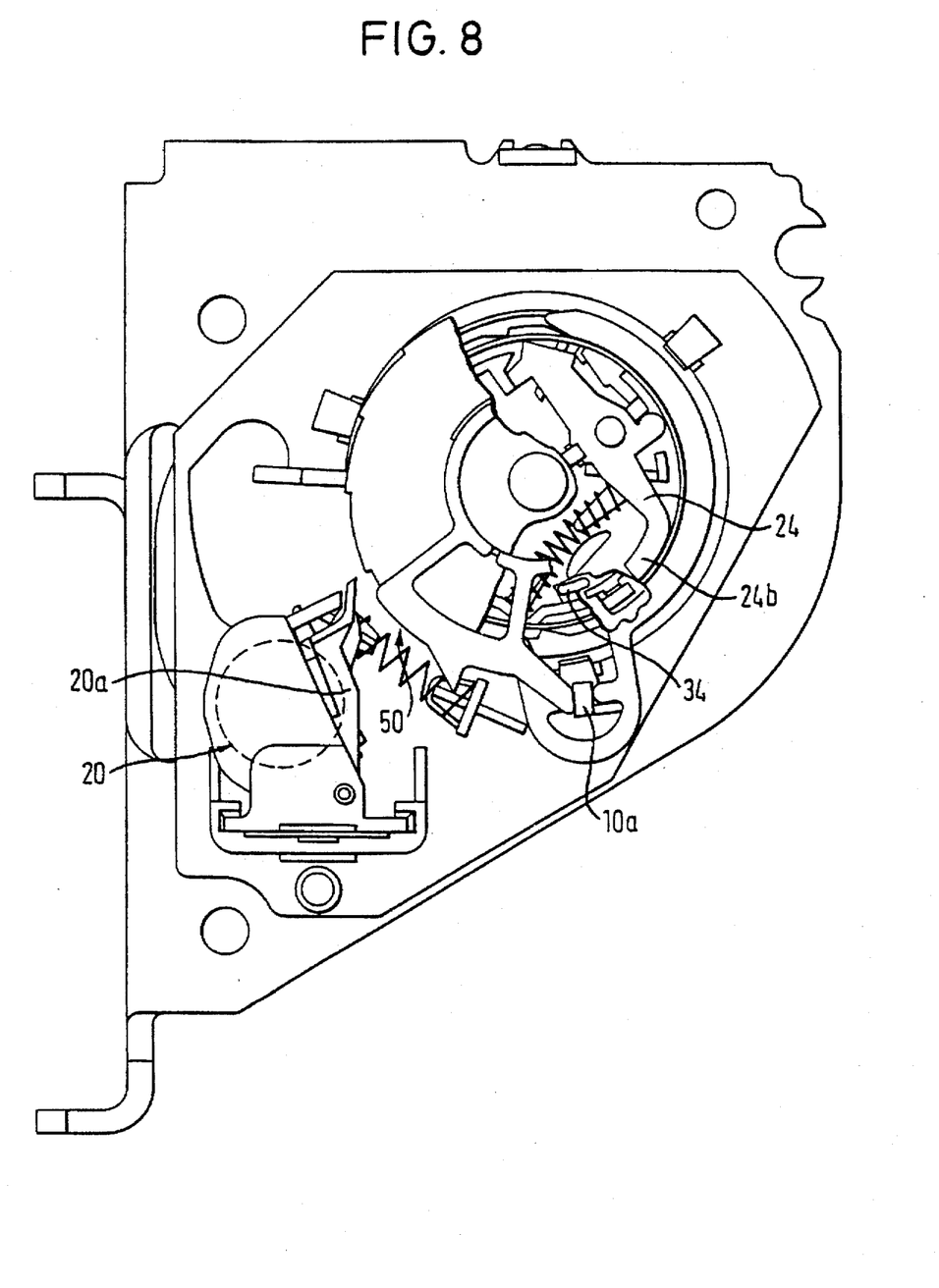
FIG. 8 is a diagrammatic side view of the belt retractor of FIG. 5 with the actuator pawls released.

FIG. 7 shows a transitional condition of the catch lever 50. This condition occurs after reversal of the direction of the rotation of the belt drum 12 from the wind-up direction to the unwinding direction and corresponds to a rotation of the belt drum 12 through the predetermined angle in the unwinding direction. The combined inertial sensor and actuator pawl is still just held captive by the engagement surface 62, extending for the predetermined angular movement, which in this embodiment too preferably amounts to between approximately 20° and approximately 25°. In the event of the belt drum 12 being turned farther in the unwinding direction, the catch lever 50, starting from the illustrated position, will be turned farther anti-clockwise until the second position is reached, in which the projection 64 is in engagement with the lug 10a and the combined inertial sensor and actuator pawl 20a is released. This is illustrated in FIG. 8. It will be seen that the catch part 34 has released the head 24b on the actuator pawl 24.

The entire catch lever 50 with the circularly arcuate arms 46 and 48, the radial arms 56 and 58 and the rib 60 constitutes a single plastic component. Each of the circularly arcuate arms 46 and 48 extends preferably for somewhat less than 180° so that between the two ends of such circularly arcuate arms a gap is left preventing the arms 46 and 48 bearing directly against one another. The force of engagement of the circularly arcuate arms 46 and 48 on the bearing part 40 is thus predominantly set by the size of the annular spring 54 and on turning of the catch lever 50 in relation to the belt drum 12 there will be a frictional force only affecting the wind-up and unwinding forces applying foe the belt webbing to an insignificant extent.

I claim:

1. A belt retractor for an occupant restraining system in vehicles, comprising:

a frame;

a belt drum rotatably mounted in the frame;

a wind-up spring acting upon the belt drum;

a locking mechanism for the belt drum;

at least one pivotable actuator pawl, the locking mechanism being activated in a manner responsive to the vehicle and/or the belt webbing by pivoting of the actuator pawl;

catch elements pivotally mounted on the belt drum and rotatable relative to the belt drum, said catch elements and the actuator pawl being able to assume, by rotation of the belt drum in the wind-up direction, a first position in relation to each other in which the catch elements engage the actuator pawl and prevent pivoting thereof, and by rotation in the unwinding direction, a second position in which the catch elements clear the actuator pawl;

wherein, for the transition from the first into the second position, a rotation of the belt drum through a predetermined angular range between approximately 20° and approximately 25° is necessary.

2. A belt retractor for an occupant restraining system in vehicles, comprising:

a frame;

a belt drum rotatably mounted in the frame;

a wind-up spring acting upon the belt drum;

a locking mechanism for the belt drum;

at least one pivotable actuator pawl, the locking mechanism being activated in a manner responsive to the vehicle and/or the belt webbing by pivoting of the actuator pawl;

catch elements pivotally mounted on the belt drum and able to rotate in relation to it, said catch elements and the actuator pawl being able to assume, by rotation of the belt drum in the wind-up direction, a first position in relation to each other in which the catch elements engage the actuator pawl and prevent pivoting thereof, and by rotation in the unwinding direction a second position, in which the catch elements clear the actuator pawl;

wherein a rotation of the belt drum through a predetermined angular range of at least approximately 10° is necessary for the transition from the first into the second position;

an activating ring with internal tooth elements, rotatably mounted on the frame, and a control disk with a control cam, which is mounted on the belt drum for limited turning motion, are provided;

the actuator pawl is pivotally mounted on one side of the belt drum and may be brought into engagement with the internal tooth means of the activating ring by means of the control cam formed on the control disk;

the actuator pawl possesses a head; and the catch elements comprise a brake disk rotatably mounted on the belt drum, the brake disk being retarded by friction between it and the frame and possessing a catch part which in the first position engages the head of the actuator pawl and in the second position releases the head.

3. The belt retractor as claimed in claim 2, wherein the catch elements further comprise a catch lever frictionally coupled with the belt drum and mounted for limited pivoting motion about the axis of the belt drum, the catch lever being provided with a circularly arcuate engagement surface extending for a range corresponding to said predetermined angular range and which in the first position engages an actuator pawl of an inertial sensor and in the second position releases said actuator pawl of said inertial sensor.

4. The belt retractor as claimed in claim 2, wherein the brake disk is able to be entrained in rotation against a frictional force in relation to the frame by the actuator pawl riding against the catch part on rotation of the belt drum, the frictional force being negligible as compared with the force of the wind-up spring.

5. The belt retractor as claimed in claim 4, wherein the catch part is constituted by a wall part extending perpendicularly from the brake disk and, on rotation of the belt drum in the wind-up direction, the head of the actuator pawl engages radially outwardly behind the wall part.

6. The belt retractor as claimed in claim 5, wherein the brake disk has a friction ring fitting about its outer periphery and the friction ring is held on the frame so as to prevent relative rotation.

7. The belt retractor as claimed in claim 6, wherein the friction ring is encircled by a spring ring.

8. The belt retractor as claimed in claim 2, characterized in that the head extends for a range corresponding to said predetermined angular range.

9. A belt retractor for an occupant restraining system in vehicles, comprising:

a frame;

a belt drum rotatably mounted in the frame;

a wind-up spring acting upon the belt drum;

a locking mechanism for the belt drum;

at least one pivotable actuator pawl, the locking mechanism being activated in a manner responsive to the vehicle and/or the belt webbing by pivoting of the actuator pawl;

catch elements pivotally mounted on the belt drum and rotatable relative to the belt drum, said catch elements and the actuator pawl being able to assume, by rotation of the belt drum in the wind-up direction, a first position in relation to each other in which the catch elements engage the actuator pawl and prevent pivoting thereof, and by rotation in the unwinding direction, a second position in which the catch elements clear the actuator pawl;

wherein a rotation of the belt drum through a predetermined angular range of at least approximately 10° is necessary for the transition from the first into the second position;

an inertial sensor and a control disk with external tooth means are provided;

the actuator pawl is pivotally mounted on the inertial sensor and in a manner responsive to the vehicle, the actuator pawl being able to be brought into engagement with the external tooth means on the control disk;

the catch elements comprise a catch lever coupled frictionally with the belt drum and able to pivot to a limited extent about the axis thereof, the catch lever having two circularly arcuate arms fitting about the periphery of a bearing part which is mounted on the belt drum so as to prevent relative rotation and which has the form of a circular disk;

the arms are held in frictional engagement with the peripheral surface of the bearing part by a metallic annular spring encircling the arms; and the catch lever is provided with a circularly arcuate engagement surface extending for a range corresponding to said predetermined angular range and which in the first position comes into engagement with the actuator pawl and in the second position releases the actuator pawl.

10. The belt retractor as claimed in claim 9, wherein in its outer periphery the bearing part possesses a groove for the circularly arcuate arms to fit into.

11. The belt retractor as claimed in claim 9, wherein the circularly arcuate arms possess a groove in their outer periphery in which the annular spring is held.

* * * * *